(12) United States Patent
DeLorme et al.

(10) Patent No.: US 8,881,192 B2
(45) Date of Patent: Nov. 4, 2014

(54) TELEVISION CONTENT THROUGH SUPPLEMENTARY MEDIA CHANNELS

(75) Inventors: David Brux DeLorme, Stone Mountain, GA (US); James Carlton Bedingfield, Sr., Gainesville, GA (US); David A. Levine, Smyrna, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 888 days.

(21) Appl. No.: 12/621,714

(22) Filed: Nov. 19, 2009

(65) Prior Publication Data

US 2011/0119726 A1    May 19, 2011

(51) Int. Cl.
| | |
|---|---|
| H04N 7/10 | (2006.01) |
| H04N 7/025 | (2006.01) |
| H04N 21/434 | (2011.01) |
| H04N 21/478 | (2011.01) |
| H04N 21/858 | (2011.01) |
| H04N 21/475 | (2011.01) |
| H04N 21/45 | (2011.01) |
| H04N 21/84 | (2011.01) |
| H04N 21/435 | (2011.01) |
| H04N 21/235 | (2011.01) |
| H04N 7/173 | (2011.01) |

(52) U.S. Cl.
CPC ......... *H04N 21/435* (2013.01); *H04N 21/4348* (2013.01); *H04N 21/478* (2013.01); *H04N 21/858* (2013.01); *H04N 21/4753* (2013.01); *H04N 21/4532* (2013.01); *H04N 21/84* (2013.01); *H04N 21/235* (2013.01); *H04N 7/17318* (2013.01)
USPC ................. 725/32; 725/34; 725/35; 725/109; 379/142.16

(58) Field of Classification Search
USPC ........................ 725/32, 34, 35, 109
See application file for complete search history.

(56) References Cited

U.S. PATENT DOCUMENTS

| | | | |
|---|---|---|---|
| 5,850,606 | A | 12/1998 | Bedingfield, Sr. |
| 6,505,348 | B1 * | 1/2003 | Knowles et al. ............... 725/49 |
| 6,608,888 | B2 | 8/2003 | Bedingfield et al. |
| 6,628,761 | B1 | 9/2003 | Adamczyk et al. |
| 6,633,633 | B1 | 10/2003 | Bedingfield |
| 6,665,388 | B2 | 12/2003 | Bedingfield |
| 6,678,362 | B2 * | 1/2004 | Hong et al. .............. 379/102.03 |
| 6,681,257 | B1 | 1/2004 | Patel et al. |
| 6,724,863 | B1 | 4/2004 | Bedingfield |
| 6,757,274 | B1 | 6/2004 | Bedingfield et al. |
| 6,810,113 | B1 | 10/2004 | Bedingfield et al. |
| 6,816,582 | B2 | 11/2004 | Levine et al. |
| 6,842,506 | B1 | 1/2005 | Bedingfield |

(Continued)

*Primary Examiner* — Robert Hance
(74) *Attorney, Agent, or Firm* — Jackson Walker L.L.P.

(57) ABSTRACT

A method and system implements supplementary media channels to Internet-protocol television (IPTV) channels. An IPTV user may receive a selected IPTV program on an IPTV channel. The IPTV program may be correlated in time with metadata describing the content of the IPTV program. At a point in the IPTV program, the metadata may match with user configuration information for receiving supplemental content. A supplementary media channel may be used at such point to provide the supplemental content to the IPTV user during the IPTV program. Supplemental content may include additional storyline content for the IPTV program or an advertising message, a redeemable coupon, a promotional offer, or an order invitation. The supplementary media channel may include a telephone connection with the IPTV user, an email message, a text message, or an instant message sent to the IPTV user, or a voice-over-Internet-protocol (VoIP) connection with the IPTV user.

23 Claims, 5 Drawing Sheets

(56) References Cited

U.S. PATENT DOCUMENTS

| | | |
|---|---|---|
| 6,853,718 B1 | 2/2005 | Bedingfield, Sr. et al. |
| 6,868,268 B2 | 3/2005 | Worsham et al. |
| 6,879,683 B1 | 4/2005 | Fain et al. |
| 6,882,708 B1 | 4/2005 | Bedingfield et al. |
| 6,947,534 B2 | 9/2005 | Levine et al. |
| 6,978,004 B1 | 12/2005 | Levine |
| 6,980,635 B2 | 12/2005 | Bedingfield et al. |
| 6,993,014 B2 | 1/2006 | Bedingfield et al. |
| 7,006,829 B2 | 2/2006 | Zhao et al. |
| 7,035,385 B2 | 4/2006 | Levine et al. |
| 7,054,654 B1 | 5/2006 | Sladek et al. |
| 7,095,834 B2 | 8/2006 | Bedingfield et al. |
| 7,103,168 B2 | 9/2006 | Bedingfield, Sr. et al. |
| 7,103,170 B2 | 9/2006 | Fain et al. |
| 7,127,051 B2 | 10/2006 | Bedingfield et al. |
| 7,127,473 B2 | 10/2006 | Agassi et al. |
| 7,136,460 B2 | 11/2006 | Bedingfield |
| 7,143,428 B1 | 11/2006 | Bruck et al. |
| 7,194,080 B2 | 3/2007 | Worsham et al. |
| 7,203,293 B1 | 4/2007 | Bedingfield |
| 7,233,656 B2 | 6/2007 | Bedingfield, Sr. |
| 7,257,212 B2 | 8/2007 | Bedingfield et al. |
| 7,274,784 B2 | 9/2007 | Bedingfield, Sr. et al. |
| 7,315,614 B2 | 1/2008 | Bedingfield, Sr. et al. |
| 7,319,742 B2 | 1/2008 | Levine |
| 7,352,855 B2 | 4/2008 | Bedingfield, Sr. et al. |
| 7,382,872 B2 | 6/2008 | Bedingfield |
| 7,388,949 B2 | 6/2008 | Contractor et al. |
| 7,389,089 B1 | 6/2008 | Nguyen et al. |
| 7,394,895 B2 | 7/2008 | Bedingfield et al. |
| 7,394,897 B1 | 7/2008 | Bedingfield, Sr. et al. |
| 7,403,768 B2 | 7/2008 | Bedingfield, Sr. et al. |
| 7,433,974 B2 | 10/2008 | Bedingfield, Sr. et al. |
| 7,450,945 B2 | 11/2008 | Bedingfield |
| 7,454,776 B1 | 11/2008 | Walker et al. |
| 7,461,350 B2 | 12/2008 | Salo et al. |
| 7,469,043 B1 | 12/2008 | McDonald et al. |
| 7,512,222 B2 | 3/2009 | Bedingfield et al. |
| 7,536,706 B1* | 5/2009 | Sezan et al. .................. 725/113 |
| 7,558,277 B2 | 7/2009 | Bedingfield, Sr. |
| 7,599,481 B2 | 10/2009 | Bedingfield |
| 7,609,820 B2 | 10/2009 | Bedingfield, Sr. |
| 7,614,068 B2 | 11/2009 | Jansky |
| 7,623,646 B2 | 11/2009 | Bedingfield, Sr. |
| 7,627,819 B2 | 12/2009 | Bedingfield, Sr. |
| 7,640,507 B2 | 12/2009 | Bedingfield, Sr. |
| 7,640,561 B1* | 12/2009 | Halke et al. .................. 725/34 |
| 7,646,856 B2 | 1/2010 | Bedingfield et al. |
| 7,664,244 B2 | 2/2010 | Bedingfield |
| 7,676,753 B2 | 3/2010 | Bedingfield |
| 7,702,337 B2 | 4/2010 | Vare et al. |
| 7,711,102 B2 | 5/2010 | Worsham et al. |
| 7,733,213 B2 | 6/2010 | Levine |
| 7,748,017 B2 | 6/2010 | Kiiskinen |
| 7,773,982 B2 | 8/2010 | Bishop et al. |
| 7,802,205 B2 | 9/2010 | Bedingfield |
| 7,827,580 B2 | 11/2010 | Rosberg et al. |
| 7,870,377 B2 | 1/2011 | Jansky |
| 7,894,589 B2 | 2/2011 | Bedingfield, Sr. |
| 7,895,157 B2 | 2/2011 | Bedingfield, Sr. |
| 7,903,802 B2 | 3/2011 | Bedingfield |
| 7,906,720 B2 | 3/2011 | DeLorme |
| 7,908,636 B2 | 3/2011 | Drazin |
| 7,920,580 B2 | 4/2011 | Bedingfield, Sr. |
| 7,925,990 B2 | 4/2011 | Bedingfield, Sr. et al. |
| 7,933,390 B2 | 4/2011 | Bedingfield et al. |
| 7,953,217 B2 | 5/2011 | Fain et al. |
| 7,975,283 B2 | 7/2011 | Bedingfield, Sr. |
| 7,978,836 B2 | 7/2011 | Bedingfield et al. |
| 7,983,408 B2 | 7/2011 | Bedingfield, Sr. et al. |
| 2002/0076022 A1 | 6/2002 | Bedingfield |
| 2002/0085542 A1 | 7/2002 | Bedingfield et al. |
| 2002/0085687 A1 | 7/2002 | Contractor et al. |
| 2002/0110227 A1 | 8/2002 | Bedingfield et al. |
| 2002/0143812 A1 | 10/2002 | Bedingfield |
| 2003/0002645 A1 | 1/2003 | Worsham et al. |
| 2003/0003927 A1 | 1/2003 | Worsham et al. |
| 2003/0063733 A1 | 4/2003 | Levine et al. |
| 2003/0165219 A1 | 9/2003 | Bedingfield et al. |
| 2003/0231759 A1 | 12/2003 | Bedingfield, Sr. et al. |
| 2004/0101124 A1 | 5/2004 | Koch et al. |
| 2004/0110465 A1 | 6/2004 | Bedingfield et al. |
| 2004/0156492 A1 | 8/2004 | Bedingfield, Sr. |
| 2004/0174978 A1 | 9/2004 | Bedingfield et al. |
| 2004/0203798 A1 | 10/2004 | Bedingfield |
| 2004/0213393 A1 | 10/2004 | Bedingfield et al. |
| 2004/0228466 A1 | 11/2004 | Bedingfield, Sr. et al. |
| 2004/0229620 A1 | 11/2004 | Zhao et al. |
| 2004/0248560 A1 | 12/2004 | Bedingfield, Sr. et al. |
| 2004/0258220 A1 | 12/2004 | Levine et al. |
| 2004/0260604 A1 | 12/2004 | Bedingfield, Sr. |
| 2004/0264655 A1 | 12/2004 | Levine |
| 2005/0005303 A1* | 1/2005 | Barone et al. .................. 725/110 |
| 2005/0034147 A1 | 2/2005 | Best, Jr. et al. |
| 2005/0041792 A1 | 2/2005 | Bedingfield, Sr. |
| 2005/0050460 A1 | 3/2005 | Bedingfield, Sr. |
| 2005/0053215 A1 | 3/2005 | Bedingfield, Sr. |
| 2005/0053223 A1 | 3/2005 | Bedingfield |
| 2005/0100143 A1 | 5/2005 | Bedingfield, Sr. |
| 2005/0117728 A1 | 6/2005 | Levine et al. |
| 2005/0152363 A1 | 7/2005 | Malik et al. |
| 2005/0232409 A1 | 10/2005 | Fain et al. |
| 2005/0259804 A1 | 11/2005 | Bedingfield |
| 2006/0003758 A1 | 1/2006 | Bishop et al. |
| 2006/0050857 A1 | 3/2006 | Bedingfield et al. |
| 2006/0126646 A1 | 6/2006 | Bedingfield, Sr. |
| 2006/0133355 A1* | 6/2006 | Anschutz ...................... 370/352 |
| 2006/0156242 A1 | 7/2006 | Bedingfield |
| 2006/0156255 A1 | 7/2006 | Bedingfield |
| 2006/0203620 A1 | 9/2006 | Bedingfield, Sr. |
| 2006/0221826 A1 | 10/2006 | Bedingfield, Sr. et al. |
| 2006/0222008 A1 | 10/2006 | Aaron et al. |
| 2006/0222015 A1 | 10/2006 | Kafka et al. |
| 2006/0224988 A1 | 10/2006 | Bedingfield, Sr. |
| 2006/0225106 A1 | 10/2006 | Bedingfield, Sr. |
| 2006/0251116 A1 | 11/2006 | Bedingfield, Sr. et al. |
| 2006/0256957 A1 | 11/2006 | Fain et al. |
| 2007/0064911 A1 | 3/2007 | Bedingfield, Sr. et al. |
| 2007/0101263 A1 | 5/2007 | Bedingfield, Sr. |
| 2007/0116249 A1 | 5/2007 | Bedingfield, Sr. et al. |
| 2007/0121806 A1 | 5/2007 | Bedingfield |
| 2007/0121868 A1 | 5/2007 | Bedingfield et al. |
| 2007/0121889 A1 | 5/2007 | Bedingfield et al. |
| 2007/0124414 A1 | 5/2007 | Bedingfield, Sr. et al. |
| 2007/0124499 A1 | 5/2007 | Bedingfield, Sr. et al. |
| 2007/0124500 A1 | 5/2007 | Bedingfield, Sr. et al. |
| 2007/0124597 A1 | 5/2007 | Bedingfield, Sr. |
| 2007/0162936 A1* | 7/2007 | Stallings et al. .................. 725/58 |
| 2007/0165827 A1 | 7/2007 | Worsham et al. |
| 2007/0206748 A1 | 9/2007 | Cassanova et al. |
| 2007/0206750 A1 | 9/2007 | Bedingfield |
| 2007/0242817 A1 | 10/2007 | Bedingfield, Sr. |
| 2007/0256007 A1 | 11/2007 | Bedingfield, Sr. |
| 2007/0256008 A1 | 11/2007 | Bedingfield, Sr. |
| 2007/0256016 A1 | 11/2007 | Bedingfield, Sr. |
| 2007/0256030 A1 | 11/2007 | Bedingfield, Sr. |
| 2007/0263884 A1 | 11/2007 | Bedingfield, Sr. |
| 2007/0273474 A1 | 11/2007 | Levine |
| 2007/0274491 A1 | 11/2007 | Bedingfield et al. |
| 2007/0297595 A1 | 12/2007 | Bedingfield, Sr. et al. |
| 2008/0075263 A1 | 3/2008 | Levine et al. |
| 2008/0092201 A1* | 4/2008 | Agarwal et al. .................. 725/135 |
| 2008/0095335 A1 | 4/2008 | Bedingfield et al. |
| 2008/0107251 A1 | 5/2008 | Bedingfield, Sr. et al. |
| 2008/0109823 A1 | 5/2008 | Whitfield et al. |
| 2008/0110991 A1 | 5/2008 | Bedingfield |
| 2008/0120556 A1 | 5/2008 | Bedingfield et al. |
| 2008/0155619 A1* | 6/2008 | Constantinof ................ 725/100 |
| 2008/0159509 A1 | 7/2008 | Whitfield et al. |
| 2008/0201736 A1* | 8/2008 | Gordon et al. .................. 725/34 |
| 2008/0226056 A1 | 9/2008 | Bedingfield |
| 2008/0261686 A1 | 10/2008 | Bedingfield |
| 2009/0016516 A1 | 1/2009 | McDonald et al. |
| 2009/0016519 A1 | 1/2009 | Bedingfield, Sr. et al. |

(56) References Cited

U.S. PATENT DOCUMENTS

| | | |
|---|---|---|
| 2009/0022141 A1 | 1/2009 | DeLorme |
| 2009/0022142 A1 | 1/2009 | DeLorme |
| 2009/0025028 A1 | 1/2009 | Cassanova et al. |
| 2009/0033517 A1 | 2/2009 | DeLorme et al. |
| 2009/0088221 A1 | 4/2009 | Gilbert et al. |
| 2009/0125955 A1 | 5/2009 | DeLorme et al. |
| 2009/0132610 A1 | 5/2009 | Bedingfield, Sr. |
| 2009/0137298 A1 | 5/2009 | Bedingfield, Sr. et al. |
| 2009/0150425 A1 | 6/2009 | Bedingfield, Sr. |
| 2009/0165030 A1* | 6/2009 | Cronin ............................ 725/14 |
| 2009/0214013 A1 | 8/2009 | Cassanova et al. |
| 2009/0232149 A1 | 9/2009 | Bedingfield, Sr. |
| 2009/0269025 A1 | 10/2009 | Bedingfield, Sr. et al. |
| 2009/0269027 A1 | 10/2009 | Bedingfield, Sr. et al. |
| 2009/0316866 A1 | 12/2009 | Bedingfield et al. |
| 2010/0058179 A1 | 3/2010 | Bedingfield, Sr. |
| 2010/0058246 A1 | 3/2010 | Bedingfield, Sr. |
| 2010/0067678 A1 | 3/2010 | Bedingfield, Sr. |
| 2010/0088610 A1 | 4/2010 | Bedingfield, Sr. |
| 2010/0111281 A1 | 5/2010 | Levine |
| 2010/0125879 A1* | 5/2010 | Peterka et al. .................. 725/87 |
| 2010/0125890 A1 | 5/2010 | Levine et al. |
| 2010/0138224 A1 | 6/2010 | Bedingfield, Sr. |
| 2010/0142693 A1 | 6/2010 | Bedingfield |
| 2010/0144310 A1 | 6/2010 | Bedingfield, Sr. et al. |
| 2010/0145890 A1 | 6/2010 | Donovan et al. |
| 2010/0179701 A1 | 7/2010 | Gilbert et al. |
| 2010/0180297 A1 | 7/2010 | Levine et al. |
| 2010/0216525 A1 | 8/2010 | Bishop et al. |
| 2010/0218223 A1 | 8/2010 | Simpson et al. |
| 2010/0235175 A1 | 9/2010 | Donovan et al. |
| 2010/0251147 A1 | 9/2010 | Donovan et al. |
| 2010/0281503 A1 | 11/2010 | DeLorme et al. |
| 2010/0282044 A1 | 11/2010 | DeLorme |
| 2011/0126086 A1 | 5/2011 | Bedingfield, Sr. |
| 2011/0130204 A1 | 6/2011 | DeLorme |
| 2011/0142059 A1 | 6/2011 | Bedingfield, Sr. et al. |
| 2011/0153116 A1 | 6/2011 | Bedingfield, Sr. et al. |
| 2011/0153738 A1 | 6/2011 | Bedingfield |
| 2011/0154207 A1 | 6/2011 | Bedingfield, Sr. |

* cited by examiner

TELEVISION CONTENT THROUGH SUPPLEMENTARY MEDIA CHANNELS

BACKGROUND

1. Field of the Disclosure

The present disclosure relates to Internet-protocol television (IPTV) and, more particularly, to providing television content through supplementary media channels.

2. Description of the Related Art

Users of IPTV services may view the same multimedia content provided with the IPTV channel to all viewers. Certain programs on IPTV channels may be suitable for personal interaction with IPTV users. Many IPTV users may be accessible via different communication channels suitable for delivering supplemental content related to IPTV programs.

DESCRIPTION OF THE EMBODIMENT(S)

Figure 1:
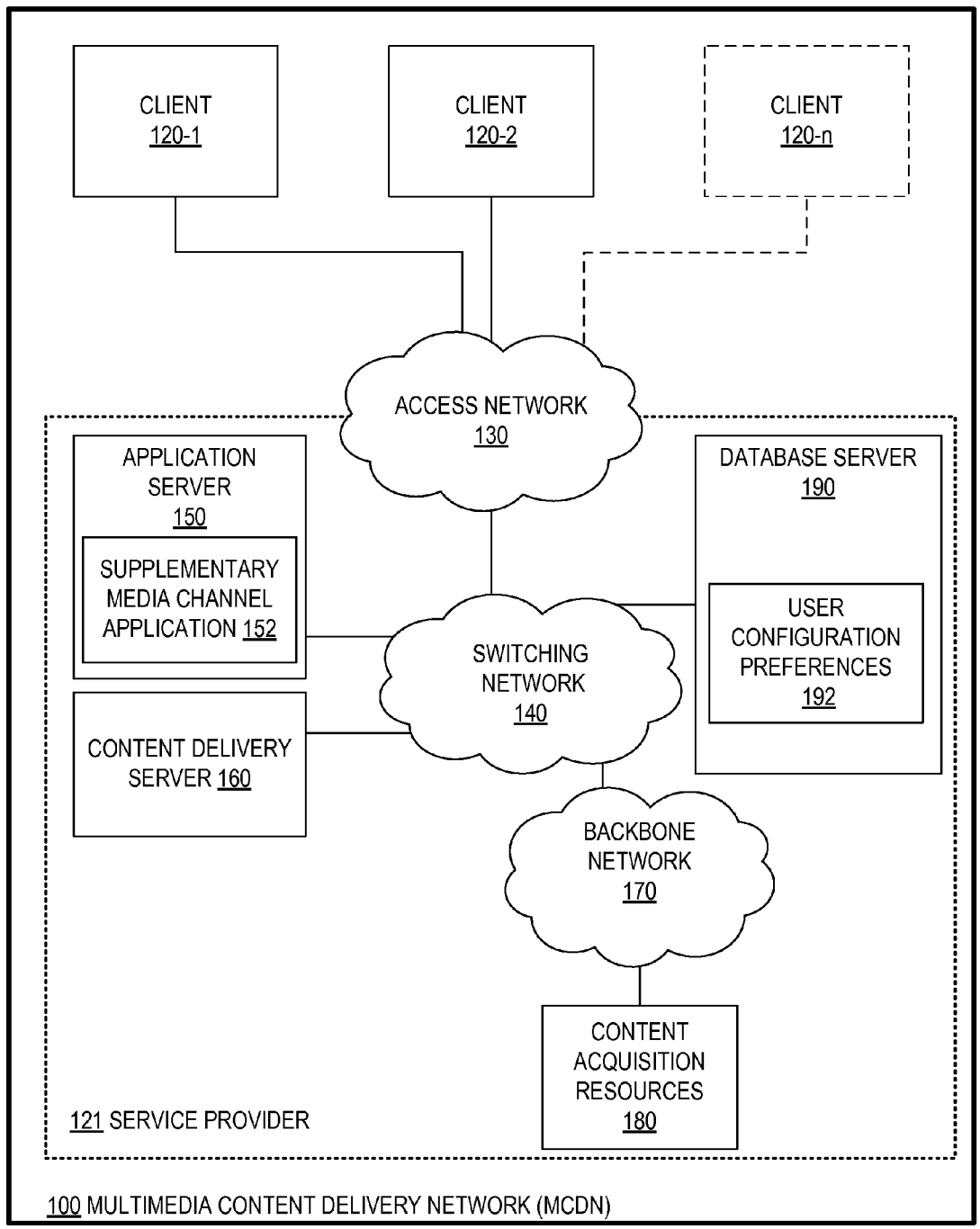
FIG. 1 is a block diagram of selected elements of an embodiment of a multimedia distribution network.

In one aspect, a disclosed method for implementing supplementary media channels with IPTV includes detecting, during streaming of an IPTV program to a user, a match between content metadata correlated to the IPTV program and user configuration information. The IPTV program may be a pre-recorded program. Based on the match, the method may further include sending supplemental content associated with the IPTV program to the user using a supplementary media channel. The supplementary media channel may be selected based on the user configuration information. The method may further include storing, in a database, the user configuration information indexed to an identity for the user. The method may still further include retrieving the user configuration information based on an identity for the user.

In certain embodiments, the method operation of sending may be contingent upon the user configuration information indicating an agreement to receive the supplementary media channel. The supplementary media channel may be a telephone connection to the user, while the supplemental content may be audio content. The telephone connection may consist of a telephone voice call or a voice message. The supplemental content may include additional speech of a character depicted in the IPTV program. The supplementary media channel may be an email message to the user. The supplemental content may include at least one of: an advertising message, a redeemable coupon, a promotional offer, and an order invitation. The content metadata may be indicative of at least one of the following elements depicted in the IPTV program: a geographic location, a topic of discussion, a dialog, an object, an event, a purchasable good, symbols, animals, colors, brand names, an actor, a character, a program genre, a name, a codeword, and a topic.

In a further aspect, a disclosed customer premises equipment (CPE) for receiving Internet-protocol television (IPTV) channels includes a processor configured to access memory media, a network adapter coupled to the processor and configured to receive multimedia content, and a display adapter coupled to the processor. The memory media accessible to the processor may include instructions executable by the processor. The processor instructions may be executable to receive, via the network adapter, multimedia content representing an IPTV program selected by a user, including metadata describing the multimedia content and correlated in time with the multimedia content, and detect, during display of the selected IPTV program using the display adapter, a match between the metadata and user configuration information. Based on the match, the processor instructions may be executable to identify supplemental content associated with the IPTV program for sending to the user via a supplementary media channel, during display of the IPTV program.

In particular embodiments, processor instructions executable to identify the supplemental content may further include processor instructions executable to send a first request to an IPTV server to identify the supplemental content, based on the match and the user configuration information. After the IPTV server identifies the supplemental content, the processor instructions may further be executable to send a second request to the IPTV server to send the supplemental content to the user via the supplementary media channel.

In selected embodiments, the memory media may further include processor instructions executable to retrieve at least a portion of the user configuration information from the IPTV server. At least a portion of the user configuration information may be stored in the memory media. The metadata may indicate multimedia content in the IPTV program depicting a communication via the supplementary media channel. The supplementary media channel may include at least one of: a telephone connection, an email message, a text message, an instant message, a voice-over-Internet-protocol (VoIP) connection, and the CPE.

In yet another aspect, a disclosed computer-readable memory media includes executable instructions for providing supplementary media channels to IPTV channels. The instructions may be executable to receive and store user configuration information for an IPTV user (the user configuration information including information indicating an agreement to receive supplemental content via a supplementary media channel), transmit an IPTV channel to a user (the IPTV channel including metadata describing the content of the IPTV channel and correlated in time with the IPTV channel), and detect, during transmission of the IPTV channel, a match between the metadata and the user configuration information. In response to detecting the match, the instructions may be executable to send supplemental content associated with the IPTV channel to the user via the supplementary media channel. The metadata may further indicate multimedia content in the IPTV program depicting a communication via the supplementary media channel.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of multimedia content delivery network (MCDN) 100. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital subscriber line (DSL) compliant twisted pair connections between clients 120 and a node (not depicted) in access network 130 while fiber, cable or another broadband medium connects service provider resources to the node. In other embodiments, the broadband cable may extend all the way to clients 120.

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL compliant connections, switching network 140 may include elements of a DSL Access Multiplexer (DSLAM) that multiplexes many subscriber DSLs to backbone network 170.

In FIG. 1, backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include supplementary media channel application 152, which, as will be described in detail below, is configured to provide supplemental content via supplementary media channels to IPTV channels.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 is shown including user configuration preferences 192, which may store user configuration information for supplementary media channels to IPTV channels (see also FIG. 4).

Figure 2:
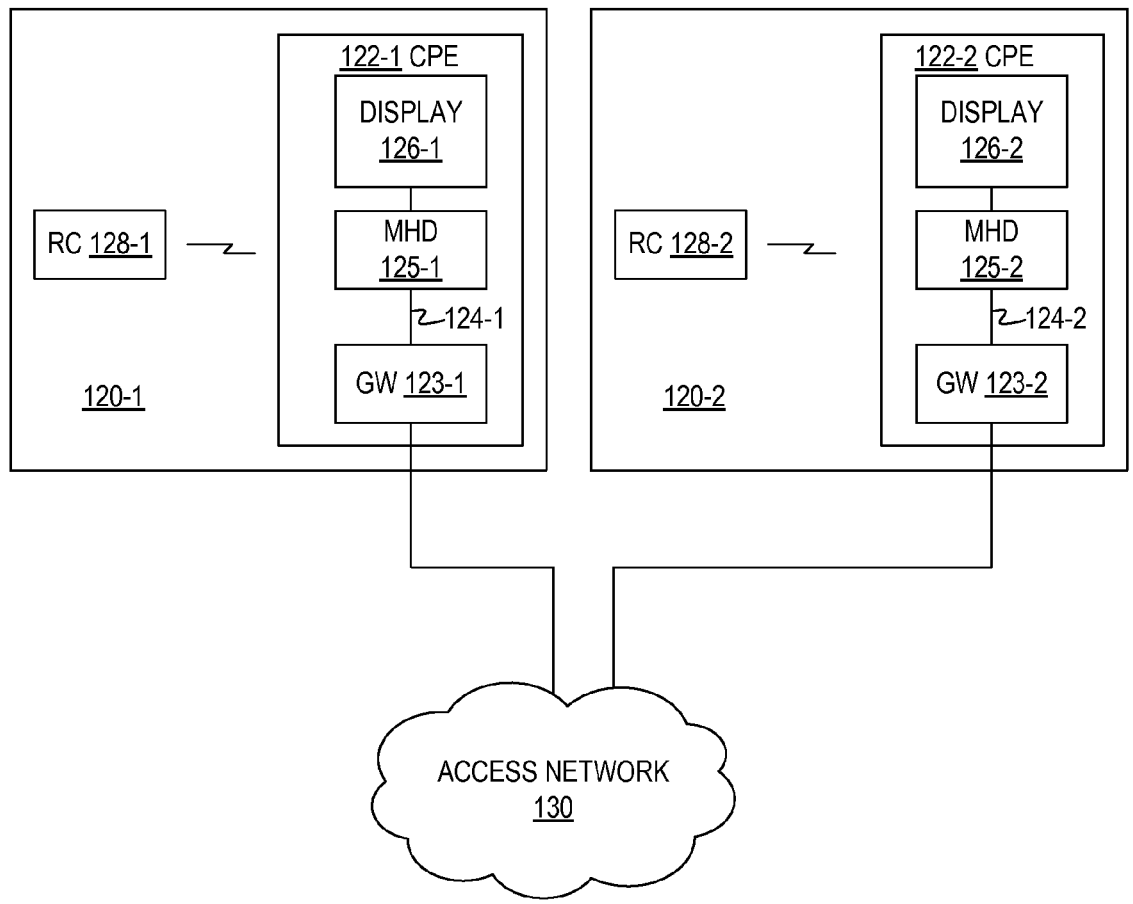
FIG. 2 is a block diagram of selected elements of an embodiment of a multimedia distribution network.

Turning now to FIG. 2, clients 120 are shown in additional detail with respect to access network 130. Clients 120 may include a network appliances collectively referred to herein as CPE 122. In the depicted embodiment, CPE 122 includes the following devices: gateway (GW) 123, multimedia handling device (MHD) 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for client 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard such as National Television System Committee (NTSC), Phase Alternating Line (PAL), or another suitable standard. Display 126 may include one or more integrated speakers to play audio content.

Clients 120 are further shown with their respective remote control 128, which is configured to control the operation of MHD 125 by means of a user interface (not shown in FIG. 2) displayed on display 126. Remote control 128 of client 120 is operable to communicate requests or commands wirelessly to MHD 125 using infrared (IR) or radio frequency (RF) signals. MHDs 125 may also receive requests or commands via buttons (not depicted) located on side panels of MHDs 125. In some embodiments, remote control 128 may represent a universal remote control device that is configured to control multiple pieces of equipment.

MHD 125 is enabled and configured to process incoming multimedia signals to produce audio and visual signals suitable for delivery to display 126 and any optional external speakers (not depicted in FIG. 2). Incoming multimedia signals received by MHD 125 may be compressed and/or encrypted, digital or analog, packetized for delivery over packet switched embodiments of access network 130 or modulated for delivery over cable-based access networks. In some embodiments, MHD 125 may be implemented as a stand-alone set top box suitable for use in a coaxial or IP-based multimedia content delivery network.

Figure 3:
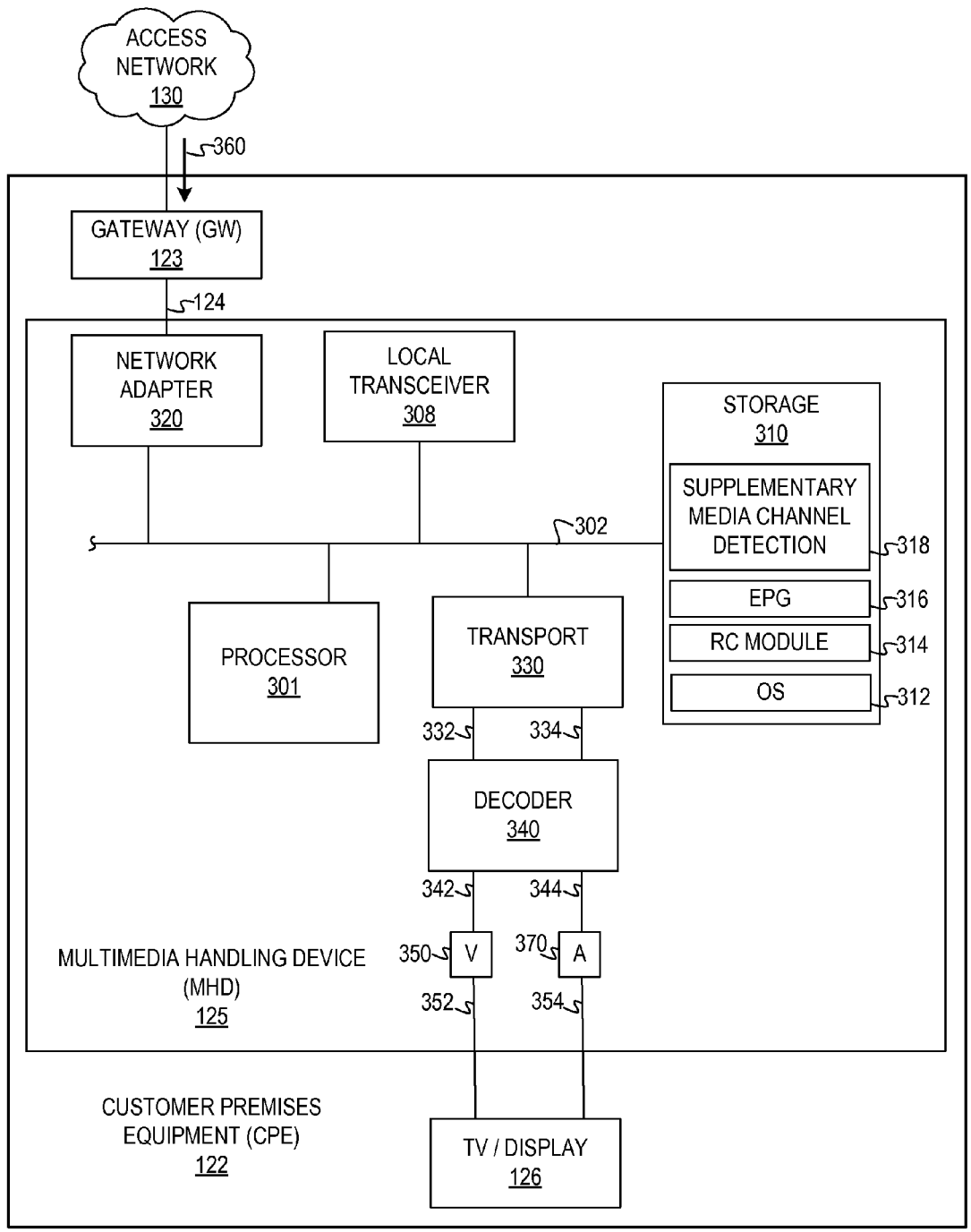
FIG. 3 is a block diagram of selected elements of an embodiment of a multimedia handling device.

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media collectively identified as storage 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in-IP based content delivery networks, MHD 125, as depicted in FIG. 3, may include transport unit 330 that assembles the payloads from a sequence or set of network packets into a stream of multimedia content. In coaxial-based access networks, content may be delivered as a stream that is not packet based and it may not be necessary in these embodiments to include transport unit 330. In a coaxial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may not be a part of MHD 125. Display 126 may comply with NTSC, PAL or any other suitable television standard.

Storage 310 encompasses persistent and volatile media, fixed and removable media, and magnetic and semiconductor media. Storage 310 is operable to store instructions, data, or both. Storage 310 as shown may include sets or sequences of instructions, namely, an operating system 312, a remote control application program identified as RC module 314, an EPG 316, and supplementary media channel detection 318. Operating system 312 may be a UNIX or UNIX-like operating system, a Windows® family operating system, or another suitable operating system. In some embodiments, storage 310 is configured to store and execute instructions provided as services to client 120 by application server 150, as mentioned previously.

EPG 316 represents a guide to the multimedia content provided to client 120 via MCDN 100, and may be shown to the user as an element of the user interface. The user interface may include a plurality of menu items arranged according to one or more menu layouts, which enable a user to operate MHD 125. The user may operate the user interface, including EPG 316, using remote control 128 (see FIG. 2) in conjunction with RC module 314. In some embodiments, supplementary media channel application 152, in conjunction with supplementary media channel detection 318, provides functionality to provide supplemental content to an IPTV user, as will be described in detail below.

Local transceiver 308 represents an interface of MHD 125 for communicating with external devices, such as remote control 128. Local transceiver 308 may provide a mechanical interface for coupling to an external device, such as a plug, socket, or other proximal adapter. In some cases, local transceiver 308 is a wireless transceiver, configured to send and receive IR or RF or other signals. Local transceiver 308 may be accessed by RC module 314 for providing remote control functionality.

Figure 4:
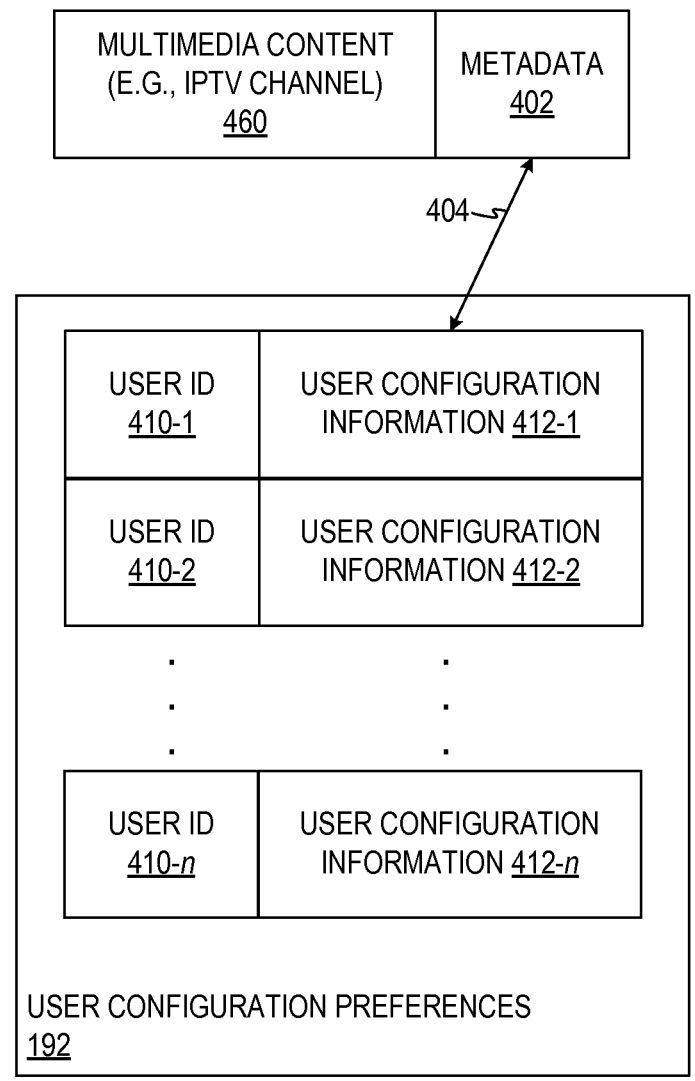
FIG. 4 illustrates a block diagram of selected elements of an embodiment of a system for user configuration of background channels.

Turning now to FIG. 4, a block diagram of selected elements of an embodiment of MCDN system 400 is depicted. MCDN system 400 illustrates selected devices, interfaces and information that may be processed to implement supplementary media channels. In one embodiment, MCDN system 400 represents data processing functionality performed using database server 190 (see FIG. 1).

In FIG. 4, multimedia content 460 may represent any of a number of IPTV channels capable of being received at an MCDN client. Multimedia content 460 is shown with metadata 402, which represents information associated with individual programs (i.e., IPTV channels) in multimedia content 460. Metadata 402 may also be referred to as "content metadata." Metadata 402 may be information included with multimedia content 460 usable to classify or select content based on certain criteria, such as classification categories. In theory, metadata 402 may be as specific as desired for a given method of classification. For example, metadata 402 may indicate content related to sports in general, or to a specific sport (i.e., football). Metadata 402 may further include an indication of a specific sports team or city (i.e., the Dallas Cowboys). Metadata 402 may further include an indication of a specific player, game, opponent, date, score, and so on. In this manner, metadata 402 may be used to match certain preferences, as indicated in FIG. 4 by match 404 with user configuration information 412.

Metadata 402 may further be correlated with an event occurring at a specific time during a duration of an IPTV program represented by multimedia content 460. For example, a character in an IPTV program may initiate a communication via a media channel, such as a telephone call using a telephone. As will be described herein, supplemental content to the IPTV program may be generated and sent to the IPTV user when such metadata 402 are detected, causing the IPTV user to receive a real communication via a supplementary media channel. Accordingly metadata 402 may comprise markers or tags for certain events and/or content categories which may result in match 404 with user configuration information 412. For example, metadata 402 may be indicative of any number of elements or content features depicted in the IPTV program, such as, but not limited to: a geographic location, a topic of discussion, a dialogue, a purchasable good, symbols, animals, colors, brand names, an actor, a character, a program genre, a name, a codeword, a topic, or any combination thereof.

In FIG. 4, user configuration preferences 192 (see also FIG. 1) are shown including a number of entries of user configuration information 412 that is indexed to a user ID 410. User ID 410 may represent an identifier for an MCDN user or MCDN user account usable to receive and view IPTV channels. In certain embodiments, an MCDN user account is associated with more than one MCDN user, such that user configuration preferences 192 may include different user configuration information 412 for different user IDs 410 for an MCDN user account. User ID 410-1 is shown indexed to user configuration information 412-1, user ID 410-2 is indexed to user configuration information 412-2, and so on up to user ID 410-$n$ indexed to user configuration information 412-$n$. In this manner, n number of entries may be stored in user configuration preferences 192, which may represent a database schema or other structured data storage.

It is noted that user configuration information 412 may include various information related to supplementary media channels, also referred to herein as "user content preferences." For example, user configuration information 412 may include user content preferences as a list of metadata tags (not shown in FIG. 4) usable to match 404 with metadata 402. An occurrence of match 404 may result in the user receiving supplemental content via a supplementary media channel while the user is viewing a selected IPTV channel. User configuration information 412 may further include a specification for at least one supplementary media channel. For example, the supplementary media channel may be at least one of: a telephone connection, an email message, a text message, an instant message, a VoIP connection, a postal mail connection, or any combination thereof. Accordingly, the supplemental content may be audio, video, text, images or any combination thereof. Configuration information 412 may further include personal contact information for the IPTV user, usable to contact the IPTV user to establish the supplementary media channel. The personal contact information may include a telephone number, an email address, a network address, a postal address, or any combination thereof, among others.

In operation, an IPTV user may enter user configuration information 412, for example, via EPG 316 (see FIG. 3) or via a web-based interface (not depicted). The entered user configuration information 420 may include configuration information 412 for a particular user ID 410. While viewing a selected IPTV channel, the viewer may activate supplementary media channel detection 318 (see FIG. 3), which may monitor for metadata 402 correlated to the selected IPTV channel. At some point in time, match 404 may be detected by supplementary media channel detection 318 (see FIG. 3). Supplementary media channel detection 318 may notify supplementary media channel application 152, which may then query user configuration preferences 192 using user ID 410 corresponding to the IPTV user. Supplementary media channel application 152 may also query other information from database system 190 for the IPTV user. Supplementary media channel detection 318 may then send a first request to supplementary media channel application 152 to identify supplemental content, based on metadata 402 and user configuration information 412, for sending to the IPTV user. The supplemental content may then be sent to the IPTV user via the supplementary media channel, for example, by supplementary media channel application 152.

In order to determine match 404, metadata 402 for a large number of IPTV channels, represented by multimedia content 460, may be compared to user configuration information 412 for a large number of IPTV users. Then, the user IDs 410 corresponding to match 404 may be determined. Based on queried user configuration information 412 and match 404, desired supplemental content may be determined and routed to corresponding IPTV users via supplementary media channels.

In various embodiments, MCDN system 400 may be used to provide different implementations of supplemental content to IPTV users. An audio portion of an IPTV channel may be muted while the supplementary media channel is in use. The supplementary media channel may be used to create a dialog with the IPTV user that is relevant to an IPTV program. The dialog may be specific to a particular IPTV user and expand a storyline in the IPTV program to real-life individuals. The supplemental content may include additional storyline content of the IPTV program, an advertising message, a redeemable coupon, a promotional offer, an order invitation, or any combination thereof, among others. The order invitation may permit the IPTV user to place an order for a good or service in real-time.

Figure 5:
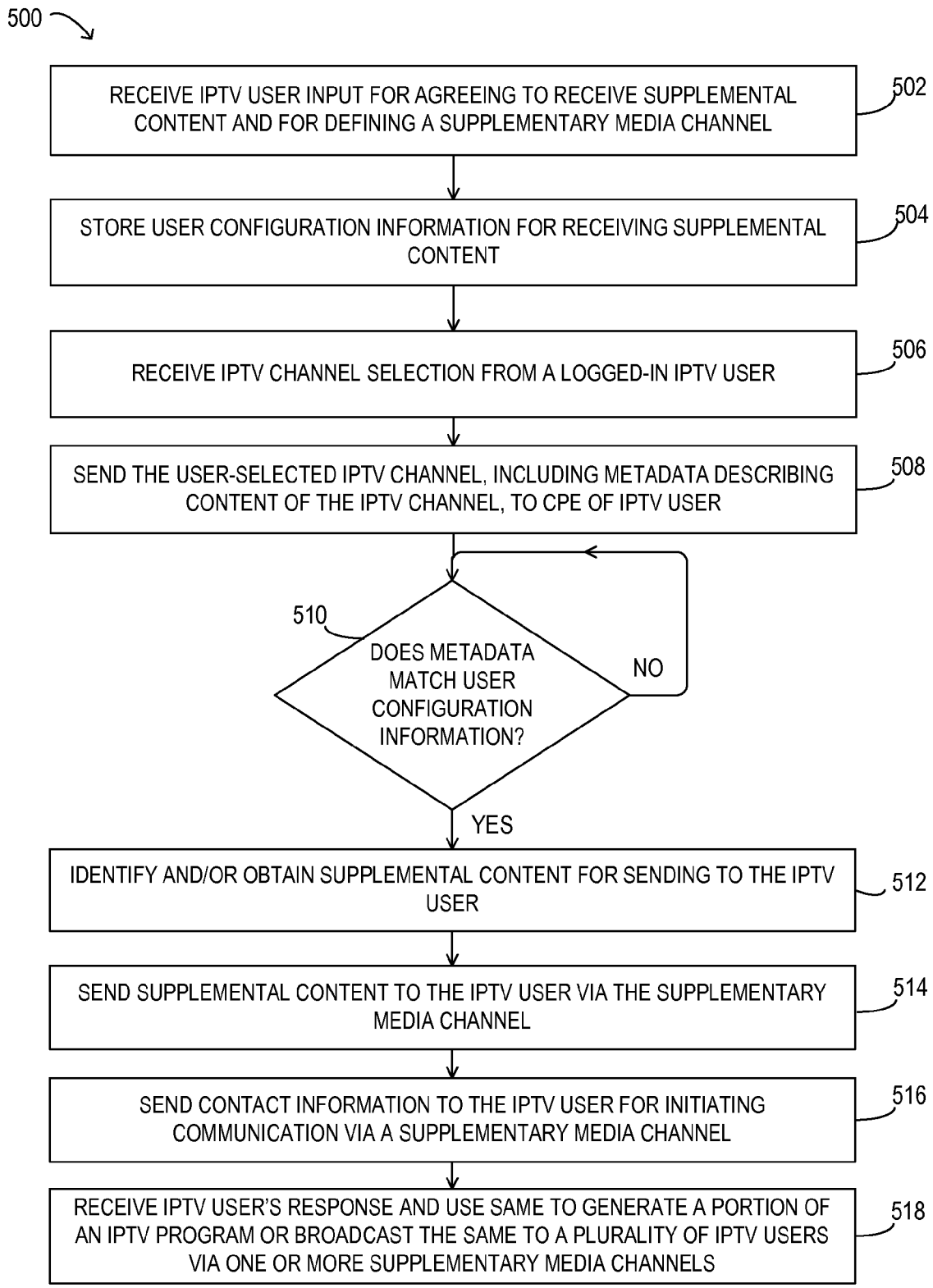
FIG. 5 illustrates an embodiment of a method for implementing alternate media channels.

Turning now to FIG. 5, an embodiment of method 500 for implementing supplementary media channels is illustrated. In one embodiment, method 500 is performed by supplementary media channel application 152 executing on application server 150. Method 500 may also be performed in conjunction with functionality provided by a client device on the MCDN, such as supplementary media channel detection 318 executing on MHD 125 of CPE 122. It is noted that certain operations described in method 500 may be optional or may be rearranged in different embodiments.

Method 500 may begin with receiving IPTV user input for agreeing to receive supplemental content and for defining a supplementary media channel (operation 502). The IPTV user may define a personal supplementary media channel for receiving the supplemental content to an IPTV program on an IPTV channel. User configuration information for receiving supplemental content may be stored (operation 504). The user configuration information may include an indication of the supplementary media channel, as well as connection or address information for contacting the IPTV user via the supplementary media channel.

It is noted that, in certain embodiments of method 500, operations 502 and 504 are performed well in advance of sending an IPTV channel to the IPTV user. Operations 502 and 504 may thus be followed by, or be replaced with, an operation to retrieve the user configuration information (not shown in FIG. 5) that was stored in operation 504.

An IPTV channel selection may be received from a logged-in IPTV user (operation 506). The IPTV user may log in using an MCDN user account for providing IPTV services at a CPE. Receiving the IPTV channel selection may cause a multicast join command to be issued on the MCDN, resulting in the IPTV user's CPE becoming a recipient for the selected IPTV channel on the MCDN. The user-selected IPTV channel, including metadata describing content of the IPTV channel, may be sent to CPE of the IPTV user (operation 508).

Next in method 500, a decision may be made, if the metadata does match the user configuration information (operation 510). The match may occur at a specific time during a duration of an IPTV program sent on the IPTV channel, and may be correlated to activities, objects, dialog, events, locations, characters, and/or actions depicted in the IPTV program. The metadata may be indicative of at least one of the following elements depicted in the IPTV program: a geographic location, a topic of discussion, a dialog, an object, an event, a purchasable good, symbols, animals, colors, brand names, an actor, a character, a program genre, a name, a codeword, and a topic. If the result of operation 510 is NO, then method 500 loops back to operation 510, effectively polling for a match during the IPTV program. If the result of operation 510 is YES, then supplemental content may be identified and/or obtained for sending to the IPTV user (operation 512). The supplemental content may be obtained from an IPTV server, an MCDN server, or an external source. Obtaining the supplemental content may include opening a communication channel to a source of the supplemental content. The supplemental content may be sent to the IPTV user via the supplementary media channel (operation 514).

Next in method in 500, the IPTV user may be provided with contact information for initiating communication via a supplementary media channel (operation 516). Such contact information may be provided on the same display as the IPTV program or via a supplementary media channel. Personal information for the IPTV user, such as a caller identification, may be merged or overlaid into the IPTV program at a pre-designated place. Similarly, the IPTV program may include personalized information, such as a list of telephone numbers of IPTV users, as a portion of the IPTV program. The IPTV user's response may be received and used to generate a portion of the IPTV program or may be broadcast to a plurality of IPTV users via one or more supplementary media channels (operation 518).

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for supplementing multimedia content, the method comprising:
    during streaming of a program over a multimedia distribution network to a user, polling program metadata for a match with user configuration information wherein a match occurs in response to a character in the program initiating a telephone call;
    responsive to detecting the match, initiating a telephone call to establish a telephone connection to the user as a supplemental media channel; and
    communicating supplemental content to the user via the supplemental media channel.

2. The method of claim 1, further comprising:
    providing contact information for initiating communication via the supplemental media channel to the user.

3. The method of claim 2, wherein the contact information comprises caller identification information.

4. The method of claim 3, further comprising:
    merging the contact information into the program.

5. The method of claim 1, wherein sending the supplemental content is contingent upon the user configuration information indicating an agreement to receive the supplemental media channel.

6. The method of claim 1, wherein the supplemental content is audio content and wherein the method includes:
    muting original audio content of the program and playing the supplemental content.

7. The method of claim 1, wherein the program includes original speech content of a character in the program and wherein the supplemental content comprises audio content including additional speech of the character.

8. The method of claim 1, wherein the content metadata is associated with a specific time within the program.

9. The method of claim 1, further comprising:
    sending an email message to the user.

10. The method of claim 1, wherein the supplemental content includes additional storyline content for the program.

11. The method of claim 1, wherein the content metadata is indicative of at least one of the following elements associated with the program: a geographic location, a discussion topic discussed in the program, program dialog, an object from the program, an event, a purchasable good, symbols, animals, colors, brand names, an actor, a character, and a program genre.

12. A non-transitory computer readable medium, including stored, processor executable instructions that, when executed by a processor, cause the processor to perform operations comprising:

during streaming of a program over a multimedia distribution network to a user, polling program metadata for a match with user configuration information wherein a match occurs in response to a character in the program initiating a telephone call;

responsive to detecting the match, initiating a telephone call to establish a telephone connection to the user as a supplemental media channel; and communicating supplemental content to the user via the supplemental media channel.

13. The computer readable medium of claim 12, wherein the content metadata is indicative of an element, associated with the program, selected from: a geographic location, a discussion topic, program dialog, an object from the program, and an event.

14. The computer readable medium of claim 12, wherein the supplemental content is audio content and wherein the operations include:

muting original audio content of the program and playing the supplemental content.

15. The computer readable medium of claim 14, wherein the program includes original speech content of a character in the program and wherein the supplemental content comprises additional speech of the character.

16. The computer readable medium of claim 12, wherein the supplemental content includes additional storyline content for the program.

17. The computer readable medium of claim 12, wherein the content metadata is indicative of an element, associated with the program, selected from: an event, a purchasable good, symbols, animals, colors, brand names, and a character.

18. The computer readable medium of claim 12, wherein detecting the match includes receiving, from a customer premise device, notification of the match.

19. An application server, comprising:

a processor;

a computer readable medium, including stored, processor executable instructions that, when executed by the processor, cause the processor to perform operations comprising:

polling, while sending a program over a multimedia distribution network to customer premise equipment associated with a user, content metadata for a match between program metadata and user configuration information wherein a match occurs in response to a character in the program initiating a telephone call; and responsive to detecting the match, initiating a telephone communication to establish a telephone connection as a supplemental media channel, wherein the telephone communication is selected from a text message communication and a voice call communication; and communicating supplemental content to the user via the supplemental media channel.

20. The application server of claim 19, wherein the program is a pre-recorded program.

21. The application server of claim 20, wherein the supplemental content is audio content and wherein the method includes:

muting original audio content of the program and playing the supplemental.

22. The application server of claim 21, wherein the program includes original speech content of a character in the program and wherein the supplemental content comprises additional speech of the character.

23. The application server of claim 19, wherein the supplemental content includes additional storyline content for the program.

* * * * *